United States Patent [19]

Cronin

[11] Patent Number: 4,546,939
[45] Date of Patent: Oct. 15, 1985

[54] ENERGY EFFICIENT ECS POWERED BY A VARIABLE VOLTAGE/VARIABLE FREQUENCY POWER SYSTEM

[75] Inventor: Michael J. Cronin, Sherman Oaks, Calif.

[73] Assignee: Lockheed Corporation, Burbank, Calif.

[21] Appl. No.: 584,699

[22] Filed: Feb. 29, 1984

Related U.S. Application Data

[63] Continuation of Ser. No. 382,491, May 27, 1982, Pat. No. 4,462,561.

[51] Int. Cl.⁴ ............................................. B64D 13/02
[52] U.S. Cl. .................................... 244/118.5; 98/1.5
[58] Field of Search ............... 244/58, 59, 118.5, 163; 98/1.5; 62/DIG. 5, 175, 323.3, 323.4, 228.4, 510; 165/15; 60/39.141, 39.142; 290/5, 6, 31, 40 A, 40 C, 46, 47; 310/113; 318/771, 773; 236/1 EA

[56] References Cited

U.S. PATENT DOCUMENTS

| | | | |
|---|---|---|---|
| 2,297,495 | 9/1942 | Pfau | 98/1.5 |
| 2,328,489 | 8/1943 | Pfau | 98/1.5 |
| 2,518,284 | 8/1950 | Clark | 62/323.4 |
| 3,511,161 | 5/1970 | Schindelman | 98/1.5 |
| 4,091,613 | 5/1978 | Young | 98/1.5 |
| 4,362,030 | 12/1982 | Voorhis | 62/510 |
| 4,419,926 | 12/1983 | Cronin et al. | 98/1.5 |

Primary Examiner—Trygve M. Blix
Assistant Examiner—Rodney Corl
Attorney, Agent, or Firm—Louis L. Dachs

[57] ABSTRACT

The invention is an ECS system designed to utilize an induction motor (12) and a cabin compressor (14) for providing pressurized air that serves as a source of energy for heating, cooling, pressurizing and other air needs of modern aircraft. An aircraft engine driven generator, preferably a permanent-magnet generator (of the samarium-cobalt, SmCo, type), furnishes variable-voltage/variable frequency, VV/VF, power to the motor (12). The electric motor itself in the preferred embodiment is a highly reliable squirrel-cage induction motor (12) powered directly from the VV/VF supply, with the result that its speed is proportional to the generator frequency, which in turn is dependent on the aircraft engine speed. The main cabin compressor (14) and a secondary (auxiliary) supercharging compressor (18) are both mounted on the motor shaft. The motor-compressor configuration is further characterized in that the ac motor has pole-changing winding (typically two), which permits two speed operation, while the cabin compressor is provided with inlet guide vanes (16). The interactive combination of these two features makes it possible to furnish the requisite air mass flow and pressurization levels over the conditions of variable air density and variable atmospheric pressure, as the airplane operates throughout its flight envelope.

17 Claims, 5 Drawing Figures

ENERGY EFFICIENT ECS POWERED BY A VARIABLE VOLTAGE/VARIABLE FREQUENCY POWER SYSTEM

This application is a continuation of application Ser. No. 382,491, filed 5/27/82, now U.S. Pat. No. 4,462,561.

TECHNICAL FIELD

The invention generally relates to an environmental control system, ECS, for aircraft and more particularly to the pressurization aspects of an ECS driven by motors powered from a direct (engine) driven variable frequency generator system.

BACKGROUND ART

Historically, the pressurization and ECS needs of most recent military and commercial aircraft have been met by tapping the compressed air energy of the aircraft turbine engines. This was accomplished by providing bleed ports or taps, on the compressor of the engine, typically at the intermediate stage and last stage of the multiple pressure stages of the compressor. In most applications, therefore, there are two pressure taps: one that is used at low power settings on the engine and another at high power settings. For example, at the take-off, climb and cruise conditions of the airplane, the intermediate stage (such as a 5th or 7th stage tap) is adequate to provide the necessary pressure-ratio to pressurize the aircraft cabin: however, at low power settings, as during loiter conditions around an airport, it is necessary to use the last stage tap, or a much higher pressure ratio bleed. These taps have led to inefficiencies of weight, and possibly more importantly, to inefficiencies of engine performance.

Because of these problems, the thrust of this invention is directed at the elimination of the practice of using engine compressor air power for the ECS, air turbine motors, icing protection requirements and other functions in an airplane. Furthermore, the practice has become more unacceptable as the world's fuel shortage problems have come into focus and the price of fuel has increased. Reacting to this, the engine designers have moved the design of their engines towards higher compression ratios and higher fan bypass ratio, so as to make the engines more fuel-efficient. Paradoxically, this has made the engines even more sensitive to "bleed," and it has promoted the present interest in the All Electric Airplane, where the use of mechanical power (to drive generators) is proposed on the grounds that this power extraction method is much less penalizing in fuel than the engine air bleed.

It has also been known in earlier piston-engined aircraft (and in the later turbo-prop aircraft), to utilize engine driven compressors as the energy source for the ECS and pressurization requirements of the airplanes. These engine driven compressors are in fact competitive with the electric motor driven compressors (which are the subject of this invention) since they are also a more energy efficient solution to the problem than bleed air. However, there are problems indigenous to the mechanical compressors that detract from their utilization as a viable source of power for the ECS, de-icing and pressurization needs of the modern airplane. Typically, the mechanical compressors run at extremely high speeds of 35,000 to 60,000 rpm; they sometimes employ gear changes to account for air density/pressure altitude variations: they incorporate electromechanical disconnects to protect the aircraft engine against mechanical failures in the ECS compressor; the compressors are located in the high vibration/high temperature environment of the aircraft engine; and the ECS compressors must incorporate a self-contained lubrication system for the gears and bearings. Finally, a more critical deficiency resides in the fact that an engine-installed compressor requires the routing and installation of expensive, customized ducting in the nacelles, pylons and wings of the airplane, which can be eliminated in the instant invention.

There are several prior art patents that relate to the use of impellers and compressors as means of providing compressed air, but none has the specificity that is the subject of the instant invention. U.S. Pat. No. 2,547,169, issued to W. W. Pagett, discloses a highly mechanically-detailed patent pursuant to a pressure regulating device for monitoring cabin pressure in an aircraft. It describes also a rotary compressor with a plurality of stages, having means for bypassing and inserting stages of the compressor to compensate for pressure/density changes. It does not, however, relate to two-speed motor compressors, operating on variable voltage/variable frequency nor does it reference the use of inlet guide vanes, IGV.

U.S. Pat. No. 4,015,438 to Kinsell et al. describes an air conditioning system primarily for rail cars or ground air conditioning systems. The system utilizes a motor driven compressor/turbine combination, in which cooling air is expanded through the turbine, while the compressor serves to restore the discharge air to ambient pressure. Another patent, U.S. Pat. No. 3,430,921 to Dewey, describes a mechanical integration of two radial air machines in which a rather unique mechanical design permits communication between the two centrifugal impellers.

As will be seen in the following description of the instant invention, none of the aforementioned inventions address the objectives and implementation aspects of a novel motor-driven compressor system (operating on a variable voltage/variable frequency system) in terms of meeting the requirements of an energy-efficient ECS in modern aircraft. From the foregoing, it can be seen that it is a primary object of the present invention to provide an ECS system that includes a motor driven compressor that operates on VV/VF power, and novel means for maintaining pressurized power over variable altitude and variable engine speed conditions of an aircraft.

It is also an object of this invention to provide an ECS system that delivers cooling air on the ground by expanding motor driven compressor pressurized discharge air and expanding it through a turbine (mounted on the motor shaft) after it has been passed through a precooler.

It is also an object of the present invention to provide an ECS system characterized by a constant pressurization capability, from low to high altitude, by using a variable-speed motor and an advanced compressor design with IGVs.

A further object of this invention is to provide an ECS system for aircraft which maintains pressurization levels, during conditions of idle-descent let-down, by the use of a second, supercharging, compressor mounted on the same shaft as a primary compressor.

DISCLOSURE OF INVENTION

The invention is designed to utilize a novel motor compressor means of providing pressurized air that serves as a source of energy for heating, cooling, pressurizing and other air needs of modern aircraft. In the preferred embodiment described herein, the aircraft generator, supplying an electric motor driving the compressors of the instant invention, is assumed to be a permanent-magnet generator (of the samarium-cobalt, SmCo, type), which characteristically furnishes variable-voltage/variable frequency, VV/VF, power when driven by a typical variable speed aircraft engine.

The electric motor that drives the compressors in the preferred embodiment is a highly reliable squirrel-cage induction motor powered directly from the VV/VF supply, with the result that its speed is proportional to the generator frequency, which in turn is dependent on the aircraft engine speed. The primary or main cabin compressor and the secondary (auxiliary) supercharging compressor are both mounted on the motor shaft. The motor-compressor configuration is further characterized in that the ac motor has pole-changing winding (typically two), which permits two speed operation, while the cabin compressor is provided with IGVs. The interactive combination of these two features makes it possible to furnish the requisite air mass flow and pressurization levels over the conditions of variable air density and variable atmospheric pressure, as the airplane operates throughout its flight envelope.

In operation, during taxi and low engine rpm (which is some 50% of the take-off/cruise engine speed), the number of poles on the motor are selected for low speed operation, since only ventilation air flow is required and there is no pressurization requirement. However, if "bootstrap" cooling is required, the motor speed is doubled by decreasing the number of magnetic poles on the motor from for example 4 poles to 2 poles. In this mode, the high pressure air from the compressor can be expanded through a turbine for cooling purposes. Alternatively, a freon compressor can be provided in lieu of the expansion turbine, and this also could provide maximum cooling at the 50% engine rpm condition by using the same modus operandi.

During take-off, the magnetic poles on the motor are changed to decrease the motor speed, but since the engines are now at 100% rpm, the compressor speed runs at the same speed as on the ground. Initially, in the climb, the air density and atmospheric pressure are high so the primary compressor IGVs are modulated towards a closed position to decrease the PR and displacement of the compressor. As the altitude increases, the compressor vane angle is opened towards 0°, to increase the PR and displacement of the compressor as the atmospheric pressure and air density decrease.

At an altitude, where the vane angle change can no longer increase the pressure ratio, to meet the increasing pressurization requirements, the magnetic poles are decreased to double the motor speed: at this time, the vane angle moves back toward the closed condition, 50°, where they will again be re-scheduled, by logic means, to re-open the guide vanes to provide the maximum pressure-ratio required at the maximum operating altitude. At this time, the vanes will be back to 0° and the compressor will be operating at maximum efficiency.

During approach and descent conditions, the lower engine power/speed settings decrease the motor speed and compromise the cabin compressor's ability to maintain cabin pressure. Therefore at the point where the cabin pressure begins to rise above the permissible maximum altitude-pressure of 8000 feet, the logic will bring in the secondary compressor to supercharge the inlet of the cabin compressor. As the aircraft descends further into conditions of higher pressure/higher density air, a point will be reached where the secondary compressor is not required and so it is again isolated. Further, later in the descent approach, the IGVs will close to decrease the PR and allow the cabin pressure to increase gradually (at the lower altitudes) to the sea-level pressure value.

Thus, with respect to the conditions of loiter and idle-descent, the invention describes the use of a secondary compressor having a lower pressure ratio. This "supercharging" compressor, used in conjunction with the IGVs, enables the cabin pressure to be maintained, when the motor speed drops in proportion to the engine speed, as it would when it is supplied with VV/VF power by the engine driven generator.

DETAILED DESCRIPTION AND BEST MODE FOR CARRYING OUT THE INVENTION

Figure 1:
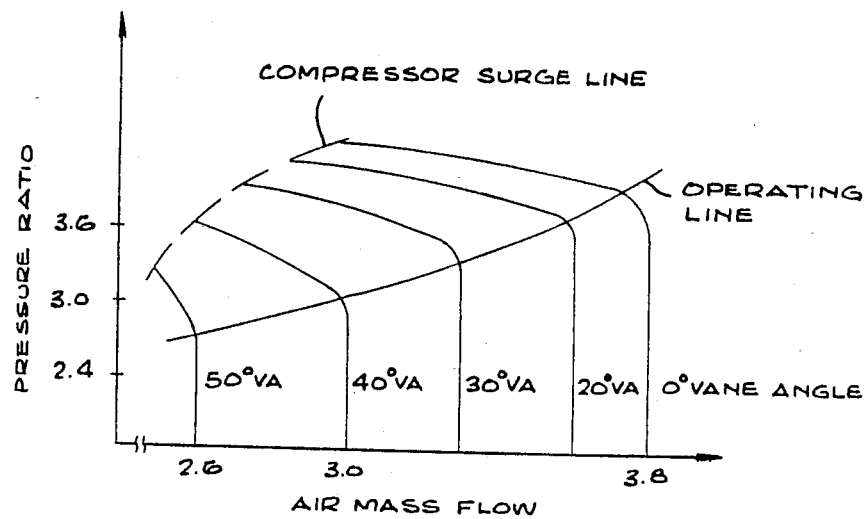
FIG. 1 is a drawing showing the performance characteristics of a constant-speed compressor operating with different IGV angles.
Figure 2:
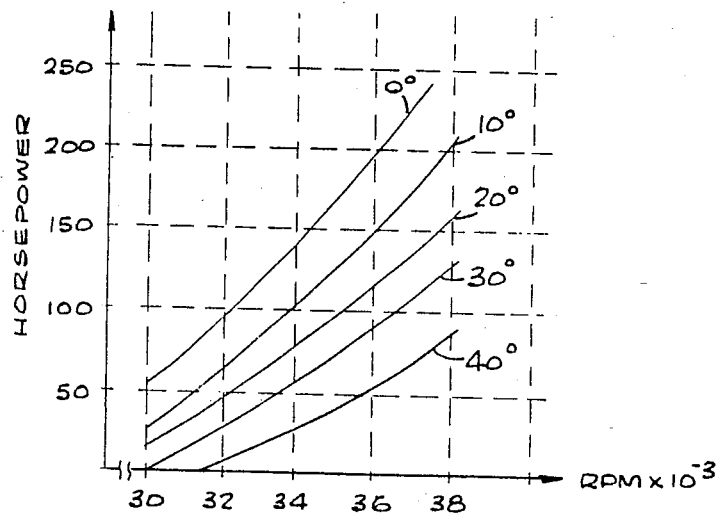
FIG. 2 is a drawing showing the performance of an IGV compressor as its speed and vane angle are changed.

Referring now to the drawings, FIG. 1 is a typical compressor map showing the performance of a compressor when vane angles are changed, as the compressor operates at constant speed. As indicated, the pressure ratio, PR, changes from approximately 2.5 at a 50° VA, to about 3.4PR at a 20° VA: it is to be also noted that the air mass flow changes from about 2.6lb/sec to slightly less than 3.6 over the same VA change. FIG. 2 shows the performance characteristics of a compressor when it is driven at variable speed; this figure illustrates the fact that horsepower developed by the compressor is a function of speed and vane angle. As indicated, at 3600 rpm, the horsepower of the compressor is approximately 200 at 0° VA and just over 50hp at a 40° VA. The curves also show that the power changes from about 200hp to 100hp, as the compressor speed changes from 36,000 rpm to 32,000 rpm when the IGVs are held at a fixed VA of 0°.

It is evident from the foregoing that the performance (PR and displacement) can be changed by the parameters of motor speed and vane angle of the compressor. Typically, the power of the compressor varies as a 3rd power function of speed ($P \alpha N^3$), while the PR is a function of speed to the second power ($PR \alpha N^2$). Thus, it can be seen that the compressor's performance can be changed as a function of the variable parameters. With this capability, therefore, it is apparent that the tendency to lose pressure-ratio during the loiter conditions could be offset by a vane angle change: this however would imply that the vanes were not fully open during the cruise flight condition, so the compressor would not be operating at its maximum efficiency. Since the cruise flight is of much longer duration than the descent condition, it would be counterproductive, to the objective of fuel-saving, for the compressor to be operating at maximum efficiency only during the loiter and idle descent conditions. Thus, the main thrust of the invention is to avoid the usual "worst-point-design" and utilize a second compressor. This second compressor is an additional turbo-machine and it will have low utilization but it permits the primary compressor to operate at maximum efficiency during the greater portion of the airplane's operating envelope.

As stated hereinabove, the purpose and objective of the present invention is to eliminate the present inefficient practice of bleeding aircraft type turbine engines and to substitute it with a motor driven compressor system of the instant invention. This purpose and objective can be accomplished as shown in FIG. 3, where the motor-driven compressor system of the present invention is the key to the achievement of the objectives.

Figure 3:
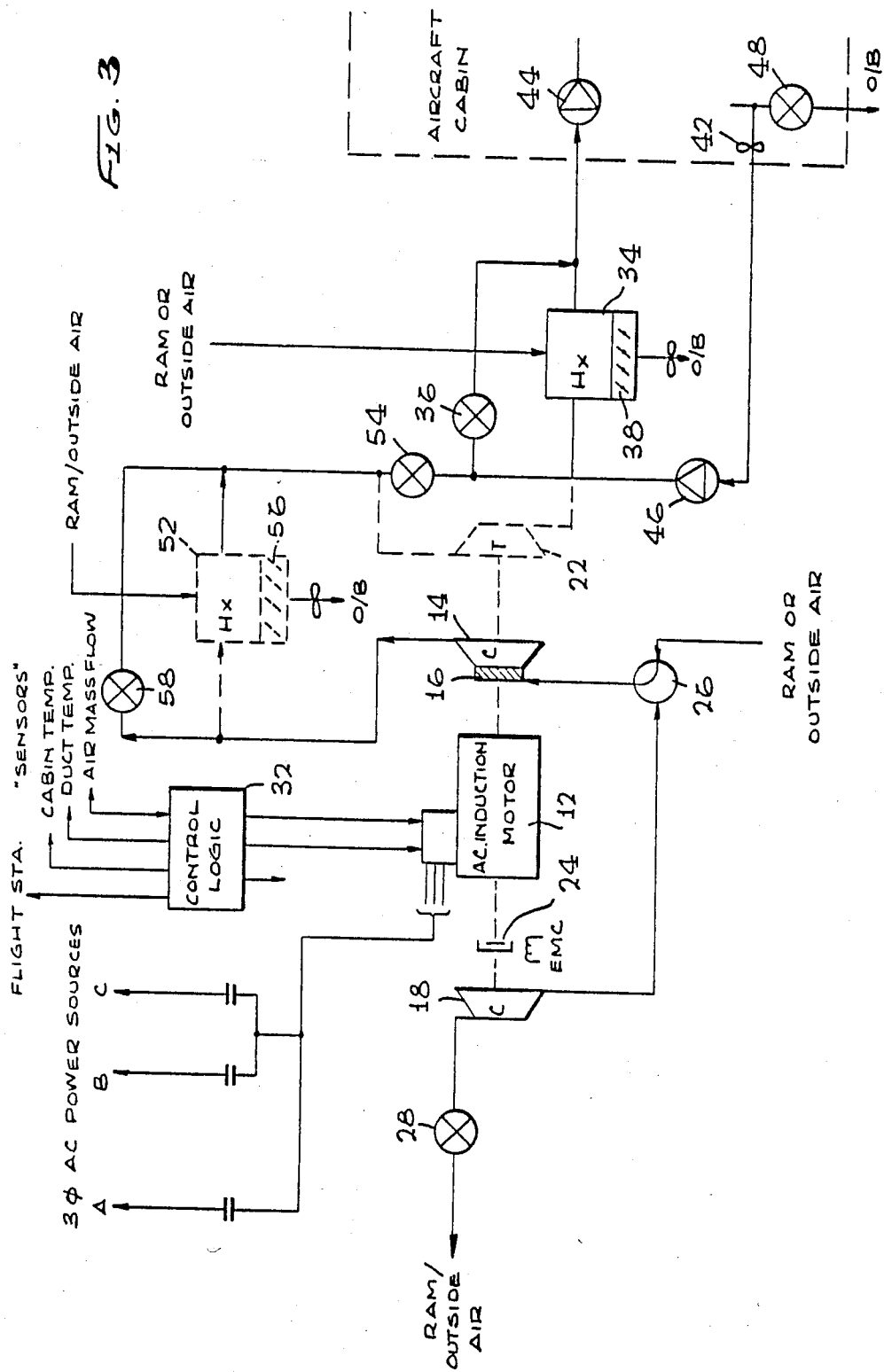
FIG. 3 is a drawing showing in simple schematic form the special motor driven compressor/ECS configuration, designed to meet the objects of the invention.

FIG. 3 shows a pole changing (2-speed) ac induction motor (12) which is designed at a constant voltage/constant frequency machine, but which is able to operate on a VV/VF power supply as described above. The motor (12) drives the main cabin compressor (14) with IGVs (16) and a second supercharging compressor (18): a turbine (22) shown dotted is also mounted on the same shaft to permit bootstrap-cooling, although this is not the main objective of this invention. Also shown is an electromagnetic clutch EMC (24) which is an option to permit isolation of the compressor (18), when it is not required for supercharging. Valves (26) and (28) are electrically actuated valves that serve to isolate supercharging compressor (18) or to connect compressor (18) in series with main cabin compressor (14). The logic assembly (32) is used to control the speed changes on the motor (12), the EMC (24) and the angular position of the IGVs (16) in response to inputs from the cockpit/flight station, pressure/flow sensors, etc. (incorporated as a part of the overall ECS). Other elements of the ECS, although not specifically pertinent to the instant invention, are a heat exchanger (34) and appropriate bypass valve (36). The heat exchanger (34) is shown utilizing ram air or fan-propelled air on the ground: the heat exchanger may be provided also with modulating shutters (38) which operate to control the air flow. The shutters (38) may be controlled by an electric actuator (not shown), which operates in response to temperature sensing on the discharge side of the heat exchanger (34). Other parts of the ECS not specifically pertinent to the instant invention are an electric recirculation fan, RCF (42), check valve (44), check valve (46) and pressure regulating outflow valve (48).

For operation of the ECS as a bootstrap cooling system (again of no specific and immediate interest) a heat exchanger (52), with appropriate bypass valve (54) is connected between the main compressor (14) and turbine (22). Ram air or fan propelled air can again be used as the cooling medium for the heat exchanger (52). Louvered shutters (56) for the heat exchanger (52) are controlled electrically as a function of outside air temperature. Other components of the cooling system consist of bypass valve (58) for the cooling turbine (22).

The operation of the novel electric turbo machine can now be described with respect to FIG. 3. With external electric power applied to the airplane, on-the-ground cooling (for example on a +100° F. day) can be accomplished by running the ac induction motor (12) at its maximum speed, as for example in a 2 pole configuration. With 3 phase 400 Hz 200VAC external power applied, the turbo machinery comprising the main compressor (14) and the cooling turbine (22) will now run at a nominal speed of 24,000 rpm (24,000 rpm-slip): the second compressor (18) may at this time be isolated by the EM clutch (24). The IGVs (16) on the compressor (14) will be set for maximum PR and the hot pressurized air will be passed through heat exchanger (34), where it will be cooled by fan propelled outside air. The pre-cooled air is then passed through the cooling turbine (22) where it will be expanded and pulled down to a low temperature. This cold air will be mixed with recirculated air from the cabin and passed through heat exchanger (34) into the cabin via the check valve (44). Temperature control of the cabin air will be controlled by the various bypass valves.

Operation of the bootstrap cooling system from the airplane's auxiliary power unit is functionally similar with the exception that, in the preferred embodiment, this auxiliary power unit power supply is 3 phase 800 Hz 400VAC. As a consequence, the magnetic poles on the motor will be changed (by the logic, (32)) to a 4 pole configuration, so that the compressor (18) and the turbine (22) will still run at a nominal speed of 24,000 rpm: cooling will therefore be as before.

When the aircraft engines are started and cooling is still required, the operation is again different, since the engines are now running at approximately 50% speed. However, the high pressure spool of the engine drives a samarium cobalt generator which also generates a 3 phase 800 Hz 400VAC power at its nominal full speed (in flight). With the engine at the 50% ground operating speed, the generated power will be 3 phase 400 Hz 200V so at this time it will be similar to the external power: consequently, the magnetic poles on the motor (12) will be again changed to the 2 pole configuration, to yield the same nominal speed of 24,000 rpm.

The following now describes the flight conditions. During take-off and climb, the engines will be running at maximum speed, causing the aircraft generators to develop 3 phase 800 HZ 400VAC power. The logic assembly (32) now responding to appropriate data inputs will set the motor (12) stator windings to a 4 pole configuration, causing the turbo machine to run again at a nominal speed of 24,000 rpm. As the airplane climbs, the demand for cooling will decrease and the turbine (22) will be gradually bypassed: a heating demand may also begin to occur and this will be provided by the heat of compression derived from cabin compressor (14). As the airplane climbs to higher altitudes, a demand for pressurization accompanies the reduction in outside air temperature. The IGVs (16) are therefore modulated by the control logic (32) to a point where the compressor (14) is developing its maximum pressure ratio at the 24,000 rpm condition. A further increase in altitude is accompanied by a further reduction in atmospheric pressure and so it becomes necessary to raise the pressure ratio of compressor (14). This is accomplished again by the logic assembly (22) establishing a 2 pole winding configuration in the induction motor (12). The motor (12) speed now rises to a nominal speed of 48,000 rpm and the IGVs (16) are stroked back towards a closed position. As the aircraft finally climbs to its ceiling altitude of say 35,000 ft., the IGVs (16) are modulated to the fully open position (0° vane angle) and the compressor (14) then develops its maximum PR at the nominal 48,000 rpm speed condition. Thus, with the IGVs fully open, the compressor (14) operates at maximum efficiency, during this cruise flight condition.

At the end of flight when the airplane commences its descent pattern, the engines will be throttled back to lower power settings: the lowest being the flight idle setting. This action results in a 10 to 20% reduction in the speed of the high pressure spool, and the frequency of the samarium cobalt generator drops to 90% and 80%, causing the motor (12) to drop in speed proportionally. This condition is sensed by the logic assembly (32) via the cabin pressure sensors and it commands the EM clutch (24) to close bringing the second compressor (18) on line. At this point the two-position control valve (26) is changed to accept discharge air from compressor (18), whose inlet control valve (28) is now opened to ram air.

Figure 4A:
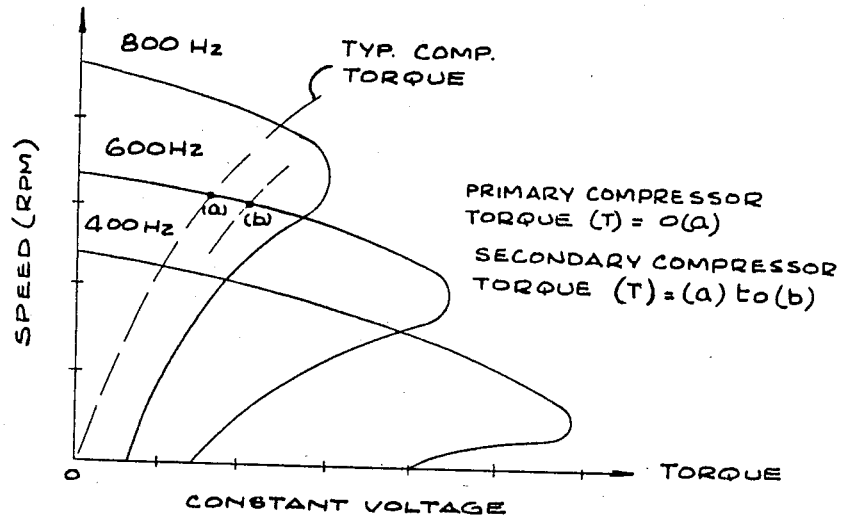
FIGS. 4A and 4B are drawings showing the performance characteristics of two ac induction motors: one designed for CV/VF and one for VV/VF.
Figure 4B:
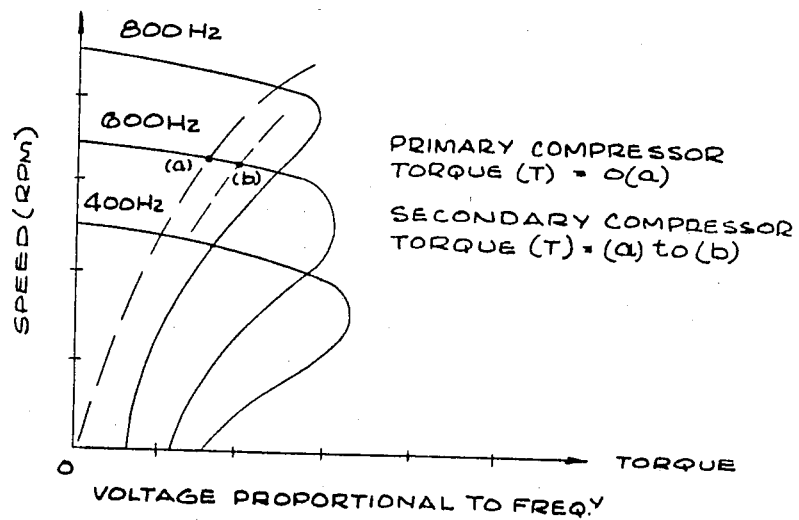

The above description of the invention illustrates the manner in which a variable speed motor (12) operating from a VV/VF supply in aircraft, can meet the diver's demands for cabin pressurization. The ability of the motor itself to sustain the additional load of the compressor (14) can be understood by reference to FIG. 4. These curves relate to an induction motor operating on a 3 phase 400V 800 Hz ac power. FIG. 4A illustrates the performance characteristic of an induction motor operating on constant voltage/variable frequency, CV/VF. This shows that as the frequency drops to 400 Hz the potential pull-out torque of the torque of the motor increases significantly, although the compressor torque, shown dotted, decreases in accord with a square law curve. In comparison, FIG. 4B shows the motor performance on variable-voltage/variable frequency: here the maximum torque of the motor remains approximately constant and as indicated, there is adequate margin over compressor torque. Therefore there is adequate torque capability with the VV/VF motor to assume the load of the second compressor (18) without the load of the compressor (14) and the second compressor (18) exceeding the torque capability of the motor (12).

The foregoing description of the invention shows that the novel integration of a two speed ac induction motor, a supercharging compressor and inlet guide vanes provides a unique source of pressurized air energy that can replace the conventional practice of obtaining pressurized air from the compressor of turbine type engines. More specifically, the description shows that the invention meets the objectives of fuel conservation and provides a more energy efficient method for powering an aircraft's environmental control and other needs. The use of electro-turbo machinery also provides the further advantages of flexibility of operation, higher reliability and, importantly, the opportunity of improved logistic and maintenance support. The practice of providing pressurized and/or conditioned air at each of the gates of a major airport stands as a highly costly investment and a system which requires significant maintenance and support.

It is apparent that there has been provided with this invention a novel Energy Efficient ECS Powered By A Variable Voltage/Variable Frequency Power System which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. In an aircraft having at least one variable speed aircraft engine and an environmental control system, the improvements comprising:
    an induction motor, said motor having an axially aligned drive shaft exiting opposite ends thereof;
    a main cabin compressor arranged to be directly driven by said drive shaft on a first end of said motor, said main cabin compressor having an inlet connected to a first outside or ram air inlet and adapted to pressurize the cabin of said aircraft;
    a supercharger compressor arranged to be driven by said motor through a clutch on the opposite end of said motor, said supercharger compressor having an inlet coupled to a second outside or ram air inlet and an outlet coupled to said main cabin compressor;
    valve means having a first position isolating said supercharging compressor from said main cabin compressor and a second position coupling said supercharging compressor in series to said main cabin compressor and isolating said first outside or ram air inlet from said main cabin compressor; and
    at least one generator driven by said at least one aircraft engine for providing variable voltage/variable frequency power to said motor, said at least one generator being directly driven by said at least one engine.

2. In an aircraft having at least one variable speed aircraft engine and an environmental control system, the improvements comprising:
    at least one generator driven by said at least one aircraft engine;
    a two-speed induction motor arranged to receive power from said at least one generator;
    a main cabin compressor arranged to be directly driven by said induction motor, said main cabin compressor having an inlet connected to a first outside or ram air inlet and adapted to pressurize the cabin of said aircraft;
    a supercharging compressor arranged to be driven by said induction motor, said supercharging compressor having an inlet connected to a second outside or ram air inlet and an outlet coupled to said inlet of said main cabin compressor;
    valve means having a first position isolating said supercharging compressor from said main cabin compressor and a second position coupling said supercharging compressor in series to said main cabin compressor and isolating said first outside or ram air inlet from said main cabin compressor; and
    an expansion cooling turbine having an inlet coupled to the outlet of said main cabin compressor and an outlet coupled to said cabin arranged to be driven by said induction motor.

3. An aircraft as in claim 2, wherein said supercharger compressor is driven through an electromagnetic clutch.

4. An aircraft as in claim 2, wherein said at least one generator is a synchronous ac generator of a permanent magnet type.

5. An aircraft as in claim 4, wherein said at least one generator is as samarium-cobalt generator.

6. An aircraft as in claim 2, wherein said at least one generator is a wound-field type generator.

7. An aircraft as in claim 2, wherein said induction motor is a squirrel-cage rotor type motor.

8. An aircraft as in claim 2, wherein said induction motor is a wound rotor type motor having speed control means.

9. An aircraft as in claim 7, wherein the stator of said motor is wound with alternative electromagnetic pole configurations to permit step-changes of speed.

10. An aircraft as in claim 2, wherein said cabin compressor includes inlet guide vanes and a turbine which is adapted to be used as an expansion cooling turbine.

11. An aircraft as in claim 7, wherein the stator of said motor carries two electromagnetic pole configurations to permit selectable speed changes.

12. An aircraft as in claim 11 including a logic assembly arranged to receive flight station/cockpit inputs and sensor data from said at least one engine, the cabin interior, and environmental control system ducts.

13. An aircraft as in any one of claims 2, 8, 9, 10, or 12 including a plurality of bypass valves, louvered shutters, and heat exchangers adapted to modulate the degree of heat transfer to and from the air mass flow into the aircraft cabin.

14. An aircraft as in any one of claims 8, 9 or 11 in which said motor speeds are changed by different magnetic pole configurations, said cabin compressor including inlet guide vanes, whereby said inlet guide vanes and motor speed changes are adapted to maintain a conditioned environment in the aircraft cabin, as the outside air density, atmospheric pressure change with operation of the airplane through its ground and flight envelope.

15. An aircraft as in claim 2, including an electromagnetic disconnect clutch for mechanically isolating said supercharger compressor.

16. An aircraft as in any one of claims 8, 9, or 11, including a logic assembly, said cabin compressor including inlet guide vanes, said logic assembly being adapted to adjust said inlet guide vanes and motor speed changes whereby the requirements of said environmental control system over the ground, climb, cruise, and descent flight conditions of said aircraft when the speed of said at least one engine varies over a speed range.

17. An aircraft as in claim 15, wherein said supercharger compressor is arranged to be brought on line by activation (opening) of said clutch via a logic assembly to maintain aircraft cabin pressurization when said at least one engine operates at lower speeds during idle descent let down of said aircraft, when said aircraft descends into higher density air and higher atmospheric pressures.

* * * * *